(12) United States Patent
Tong et al.

(10) Patent No.: US 10,579,373 B2
(45) Date of Patent: Mar. 3, 2020

(54) SEAMLESS EXTENSION PORTING

(71) Applicant: Microsoft Technology Licensing, LLC, Redmond, WA (US)

(72) Inventors: Chee Chen Tong, Redmond, WA (US); Praveen Kumar Muralidhar Rao, Bellevue, WA (US); Andrew Messick, Redmond, WA (US); Scott S. Sheehan, Redmond, WA (US); Michael Z. Stephens, Seattle, WA (US); Sebastian Poulose, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

Patent file contains an affidavit/declaration under 37 CFR 1.130(b).

(21) Appl. No.: 15/426,944

(22) Filed: Feb. 7, 2017

(65) Prior Publication Data
US 2018/0225112 A1    Aug. 9, 2018

(51) Int. Cl.
*G06F 9/44* (2018.01)
*G06F 8/76* (2018.01)
(Continued)

(52) U.S. Cl.
CPC .................. *G06F 8/76* (2013.01); *G06F 8/36* (2013.01); *H04L 67/02* (2013.01); *H04L 67/10* (2013.01);
(Continued)

(58) Field of Classification Search
CPC .......... G06F 8/36; G06F 8/76; G06F 9/45529; H04L 67/10; H04L 67/02; H04L 67/2823; H04L 67/42
See application file for complete search history.

(56) References Cited

U.S. PATENT DOCUMENTS

| 8,504,991 | B2 | 8/2013 | Huang et al. |
| 8,667,487 | B1 * | 3/2014 | Boodman ............... G06F 21/53 717/178 |

(Continued)

OTHER PUBLICATIONS

Microsoft Edge notification in an extension, Dec. 8, 2016, 5 pages (Year: 2016).*

(Continued)

*Primary Examiner* — Lewis A Bullock, Jr.
*Assistant Examiner* — Tina Huynh
(74) *Attorney, Agent, or Firm* — Talem IP Law, LLP

(57) ABSTRACT

Techniques are presented for providing seamless extension porting. A second browser of a client device can receive a call to execute extension code containing function calls for a first browser. The extension code can further include a preload manifest key, which can include at least one bridge script property providing a bridge between function calls for the first browser and function calls for the second browser. In response to receiving the call to execute the extension code, the at least one bridge script property of the preload manifest key may be performed to execute the referenced bridge. Subsequently, remaining code of the extension code may then be executed. The bridge can receive function calls by the extension code. When a function call for the first browser is received, the bridge can map the function call for the first browser to a corresponding function call supported by the second browser.

20 Claims, 4 Drawing Sheets

(51) Int. Cl.
  *H04L 29/06* (2006.01)
  *H04L 29/08* (2006.01)
  *G06F 8/36* (2018.01)
  *G06F 9/455* (2018.01)

(52) U.S. Cl.
  CPC .......... *H04L 67/2823* (2013.01); *H04L 67/42* (2013.01); *G06F 9/45529* (2013.01)

(56) References Cited

U.S. PATENT DOCUMENTS

| | | | |
|---|---|---|---|
| 8,694,988 | B2 | 4/2014 | Goldman |
| 8,914,813 | B1 | 12/2014 | Sigurdsson et al. |
| 9,002,808 | B1* | 4/2015 | Liu .................. G06F 3/048 707/694 |
| 9,565,233 | B1* | 2/2017 | Ozuysal .............. H04L 67/2842 |
| 2003/0126311 | A1 | 7/2003 | Kushnirskiy et al. |
| 2010/0122157 | A1 | 5/2010 | Cepero Gonzalez |
| 2014/0089904 | A1* | 3/2014 | Wray .................. G06F 11/3672 717/135 |
| 2014/0245124 | A1 | 8/2014 | Gonzalez |
| 2014/0380137 | A1 | 12/2014 | Zhang et al. |
| 2015/0154059 | A1* | 6/2015 | Teng .................. G06F 8/31 719/328 |

OTHER PUBLICATIONS

Initial work for Firefox and Edge extensions, Dec. 16, 2016 (Year: 2016).*

"Cross Browser Extension Development", http://web.archive.org/web/20160128215616/http://www.besttoolbars.net/products/cross-browser-extensions-framework/, Published on: Jan. 28, 2016, 5 pages.

"Kango framework", http://kangoextensions.com/kango.html, Retrieved on: Nov. 17, 2016, 2 pages.

"Create Cross Browser Extensions in Minutes", http://crossrider.com/developers, Retrieved on: Nov. 17, 2016, 5 pages.

Osmani, Addy, "The Developer's Guide to Writing Cross-Browser JavaScript Polyfills", https://addyosmani.com/blog/writing-poly-fills/, Published on: Aug. 11, 2011, 15 pages.

"Manage multiple babel-polyfill imports instead of throwing an exception", https://github.com/babel/babel/issues/4019, Retrieved on: Nov. 17, 2016, 3 pages.

Cook, et al., "HTML5 Cross Browser Polyfill", https://github.com/Modernizr/Modernizr/wiki/HTML5-Cross-Browser-Polyfills, Retrieved on: Nov. 17, 2016, 17 pages.

* cited by examiner

Extension Toolkit

Load Extension to Convert — 315
360

My extension — 330
- appxmanifest.xml
- background.html
- background.js — 320
- backgroundScriptsAPIBridge.js
- content.js — 325
- contentScriptsAPIBridge.js
- manifest.json — 305
- icon_20.png
- icon_40.png
- popup.css
- popup.html
- popup.js Save Files    🔄 Re-Validate — 355    📖 Documentation

```
1  {
2    "author": "",
3    "background": {
4      "page": "background.html",
5      "persistent": true
6    },
7    "content_scripts": [                         340
8      {
9        "matches": [
10         "*://*/*"
11       ],
12       "js": ["content.js"],
13       "run_at": "document_end"
14     }
15   ],
16   "-ms-preload": {                             335
17     "backgroundScript": "backgroundScriptsAPIBridge.js",
18     "contentScript": "contentScriptsAPIBridge.js"
19   },
20   "browser_action": {
21     "default_icon": {
22       "{ENTER SIZE}": "icon_20.png"
23     },
24     "default_title": "Get page info",
25     "default_popup": "popup.html",
```

❌ Errors (2)  ⚠ Warnings (0)  ℹ Info (0)
❌ manifest.json .browser_action.default_icon.{ENTER SIZE} : Additional properties not allowed — 345
❌ manifest.json .author : String is too short (0 chars), minimum 1 — 350

SEAMLESS EXTENSION PORTING

BACKGROUND

Browser extensions are small programs that can be used to add new features to a browser or modify the existing functionality. It is preferable for a browser extension developer to create extensions to work across all browsers, such as MICROSOFT EDGE, GOOGLE CHROME, APPLE SAFARI, and MOZILLA FIREFOX.

However, creating an extension that is compatible with different browsers can be very time consuming. Every browser has its own differences in terms of design and behavior. Therefore, the syntax for an extension might be different from browser to browser, which requires extension developers to insert code that workaround those differences for each of the different browsers. Currently, to reuse an existing extension on a different browser, extension developers must create logic in their extension code that checks for the different browser's host, e.g. checking for user agent string.

BRIEF SUMMARY

Techniques are presented for providing seamless extension porting for extensions of a first browser to be used as extensions of a second browser.

Using the described feature, a second browser of a client device can receive a call to execute extension code containing function calls for a first browser. The extension code includes a preload manifest key that signals to the second browser to execute the included files before other code. The preload manifest key can include at least one bridge script property providing a bridge between function calls for the first browser and function calls for the second browser.

In response to receiving the call to execute the extension code, the at least one bridge script property of the preload manifest key is performed to execute the bridge referenced in the at least one bridge script property. Subsequently to the at least one bridge script property, remaining code of the extension code may be executed.

The bridge can receive function calls by the extension code and when a function call for the first browser is received, the bridge can map the function call for the first browser to a corresponding function call supported by the second browser. Mapping the function call for the first browser can include defining the function call for the first browser to call a corresponding function call for the second browser. The function call for the first browser is a known function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates a user interface of a tool for seamless extension porting.

DETAILED DESCRIPTION

Techniques are presented for providing seamless extension porting for extensions of a first browser to be used as extensions of a second browser.

There are many differences between one browser's version of an extension platform and another browser's version of an extension platform. One difference may be that each browser may use a different namespace. A namespace refers a grouping of one or more names that represent individual objects within the group in a shared computing network. For example, a GOOGLE CHROME web browser uses a customized namespace, called chrome namespace, while a MICROSOFT EDGE web browser uses a standard namespace, called browser namespace. There may also be application programming interface (API) behavioral differences due to the differences in the extension platform.

A polyfill library can minimize browser-specific logic in the extension code. Browser specific behaviors and differences can be abstracted away into the polyfill libraries (e.g., bridges). Then, when the extension code is executed by a browser from a different vendor, a preload manifest key can be used to ensure that the bridges are loaded first. Different polyfills can be specified for different browsers. Advantageously, this aids in abstracting away code that addresses browser differences and allows extension developers to focus on a single codebase for evolving their extensions. As browser vendors fix and converge on an agreed standard, the developers can modify and remove the polyfill code as needed.

Using the described feature, the second browser of a client device can receive a call to execute extension code containing function calls for the first browser. The extension code includes a preload manifest key that signals to the second browser to execute the included files before other code. The preload manifest key can include at least one bridge script property providing a bridge between function calls for the first browser and function calls for the second browser. In response to receiving the call to execute the extension code, the at least one bridge script property of the preload manifest key is performed to execute the bridge referenced in the at least one bridge script property. Subsequently to the at least one bridge script property, remaining code of the extension code may be executed.

The bridge can receive function calls by the extension code and when a function call for the first browser is received, the bridge can map the function call for the first browser to a corresponding function call supported by the second browser. Mapping the function call for the first browser can include defining the function call for the first browser to call a corresponding function call for the second browser. The function call for the first browser is a known function.

Figure 1:
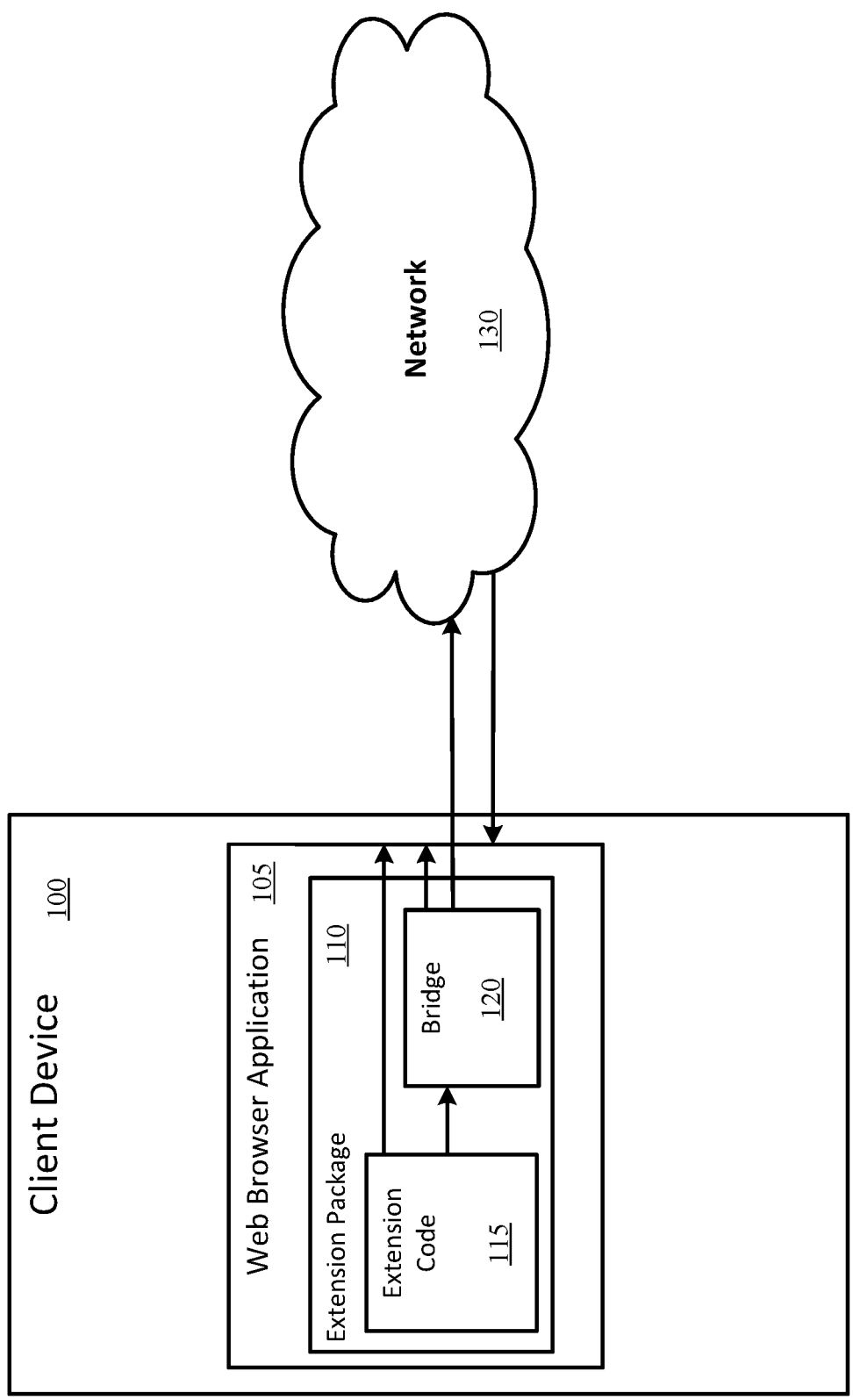
FIG. 1 illustrates an example run-time operating environment.

FIG. 1 illustrates an example run-time operating environment. Referring to FIG. 1, the example operating environment may include a client device 100, a web browser application ("browser") 105, and an extension package 110, with extension code 115 and bridge 120, and a network 130.

Client device 100 may be a general-purpose device that has the ability to run one or more applications. The client device 100 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, or a smart television. The client device 100 may be used to access the browser 105 over a network 130.

The browser 105 is an application program for retrieving and traversing information resources on the World Wide Web ("the Web"), as well as resources provided by web servers in private networks, via the network 130, and presenting the information resources to a user (e.g., rendering for display). Moreover, the browser 105 allows a user to access information and various functions provided by a server.

The extension package 110 may be a software package for a browser extension. A browser extension refers to a small program that can be used to add new features to a web browser or modify and enhance the existing functionality of the web browser. The extension package 110 may include extension code 115 and a bridge 120. The extension code 115 may include function calls for a first browser. The function calls for the first browser may be, for example, function calls for a web API, a browser specific API, or any other function. The function calls for the first browser may be contained within a variety of files, for example, a manifest file, HyperText Markup Language (HTML) files, Cascading Style Sheets (CSS) files, JavaScript files, and image files.

In some cases, the extension code 115 may include a background page that is run in a background process. The background page is defined by a HTML file, such as background.html, and can include JavaScript code that controls the behavior of the extension.

In cases where the extension needs to interact with web pages that a user loads, the extension code 115 may include a content script that runs in a content process. The content script may be a JavaScript file, such as content.js, that executes in the context of a web page that has been loaded into the browser.

The extension code 115 also includes the manifest file. The manifest file can be a JSON-formatted manifest file, such as manifest.json, and contains metadata about the extension. The metadata may include information on the most important files and capabilities that the extension might use. The manifest file may include a preload manifest key. The preload manifest key includes at least one bridge script property that indicates a file within the extension package 105 that contains the bridge 120. The preload manifest key provides the ability to preload any custom file, such as a JavaScript file, that allows the browser 105 to support an extension that was written for another browser (e.g., a browser from a different vendor).

The at least one bridge property may be a backgroundScript property that provides the bridge 120 between the background process function calls for the first browser and the background process function calls for the second browser (browser 105). Further, the at least one bridge property may be a contentScript property that provides the bridge 120 between the content process function calls for the first browser and the content process function calls for the second browser (browser 105).

The bridge 120 may be a JavaScript file indicated by the at least one bridge script property. Further, the bridge 120 may be in the form of a polyfill library. A polyfill refers to code that implements a feature on a web browser that does not support that feature. The bridge 120 can act as an API bridge between function calls for a first browser and function calls for a second browser (browser 105), where the first browser and the second browser are from different vendors.

By including the bridge 120 and the preload manifest key that includes the at least one bridge script property that provides the bridge 120 in the extension package 110, an extension developer can abstract away all browser specific behaviors and differences into the polyfill library (e.g. the bridge 120). Therefore, when a call to execute a function of the extension code 115 is received by the browser 105, the bridge 120 receives that call and maps the functions to the corresponding function supported by the second browser (the browser 105).

In some cases, when executing the extension package 110, the extension code 115 can send the calls to the bridge 120. The bridge 120 can then execute the calls and send a result to the browser 105. In other cases, the calls may be for an over the network API. In some cases, the extension code 115 can send the calls for the over the network API to the bridge 120; the bridge 120 can send a request to the network 130 and the network 130 can then send a response to the browser 105. In yet another case, when executing the extension package 110, the extension code 115 can execute generic APIs, such as web JavaScript APIs, which will go to the browser 105 directly, instead of going through the bridge 120.

The network 130 may be an internet, an intranet, or an extranet, and can be any suitable communications network including, but not limited to, a cellular (e.g., wireless phone) network, the Internet, a local area network (LAN), a wide area network (WAN), a WiFi network, or a combination thereof. Such networks may involve connections of network elements, such as hubs, bridges, routers, switches, servers, and gateways. The network 130 may include one or more connected networks (e.g., a multi-network environment) including public networks, such as the Internet, and/or private networks such as a secure enterprise private network. Access to the network 130 may be provided via one or more wired or wireless access networks (not shown), as will be understood by those skilled in the art. As will also be appreciated by those skilled in the art, communication networks can take several different forms and can use several different communication protocols.

In some cases, communication between the browser 105 and/or extension 110 may be accomplished via APIs. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 2:
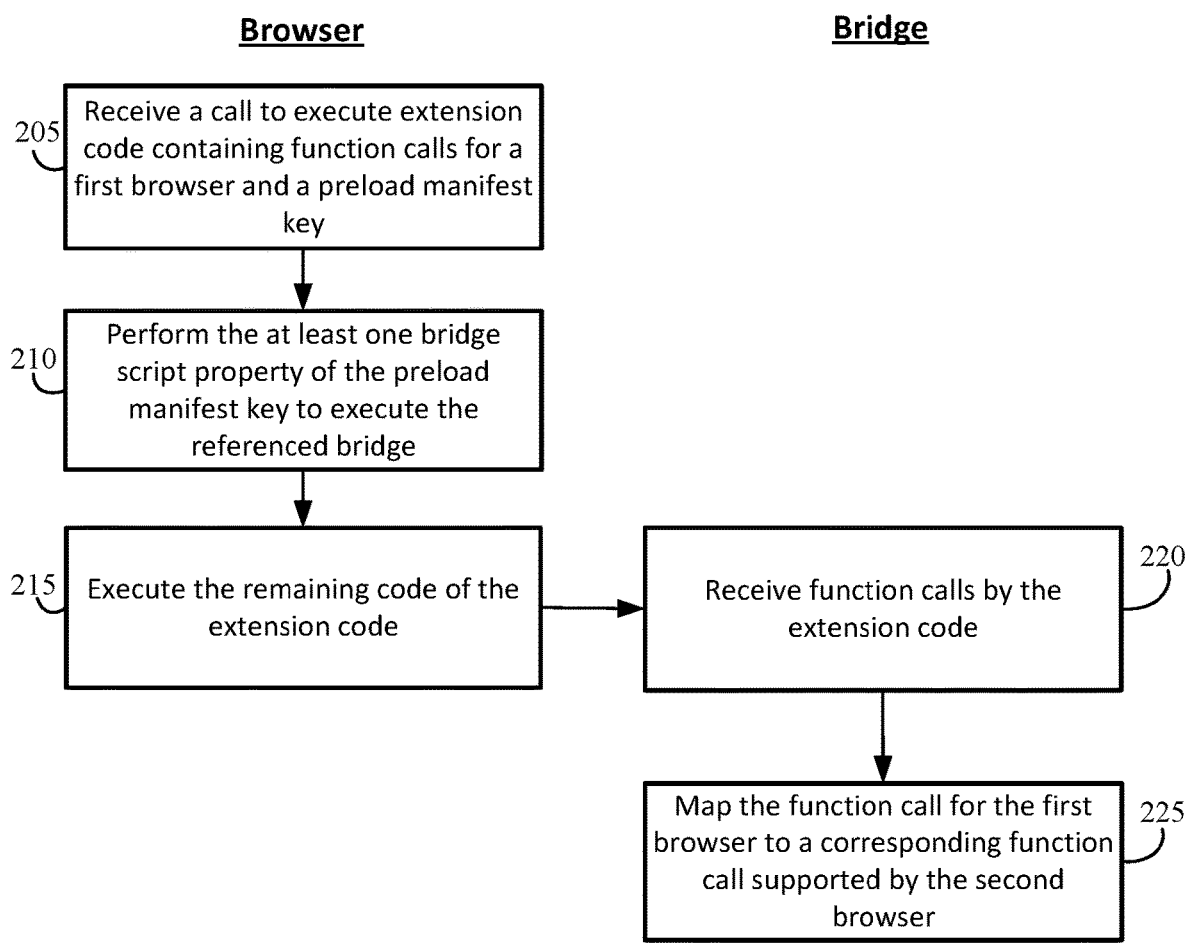
FIG. 2 illustrates an example process flow diagram of a run-time for an extension incorporating seamless extension porting.

FIG. 2 illustrates an example process flow diagram of a run-time for an extension incorporating seamless extension porting. Referring to FIG. 2, a second browser can receive a call to execute extension code containing function calls for a first browser (205). The extension code includes a manifest file, which as previously described, may include a preload manifest key. The preload manifest key may include at least one bridge script property providing a bridge between function calls for the first browser and function calls for the second browser. The bridge may be a JavaScript file indicated by the at least one bridge script property. The preload manifest key directs the browser to load the bridge prior to executing any remaining code of the extension code.

In response to receiving the call to execute the extension code (205), the browser may perform the at least one bridge script property of the preload manifest key to execute the bridge referenced by the at least one bridge script property (210). The execution of the bridge may load the bridge JavaScript files into memory. The browser can then execute the remaining code of the extension code (215).

During execution of the extension code (215), the bridge may receive function calls by the extension code (220). Some calls are well understood by the second browser; however, since the code includes code developed for the first browser, when a function call for the first browser is received, the bridge can map the function call for the first browser to a corresponding function call supported by the second browser (225). To map the function call for the first browser, the bridge may define the function call for the first browser as a corresponding known function of the second browser. Therefore, any time a function call for the first browser is executed, that function call will then call into the corresponding function supported by the second browser.

As previously described, one reason that the function call for the first browser is mapped to the corresponding function call of the second browser may be that the first browser and the second browser may use a different namespace. The bridge maps the namespace of the first browser to the namespace of the second browser. For example, a MICROSOFT EDGE web browser user can download a GOOGLE CHROME extension that has undergone seamless extension porting. When the extension calls a known GOOGLE CHROME API, for example, chrome.runtime, the bridge will include a method that is called chrome.runtime that calls into browser.runtime, which is supported by MICROSOFT EDGE. Therefore, the GOOGLE CHROME extension can be run on the MICROSOFT EDGE web browser.

FIG. 3 illustrates a user interface of a tool for seamless extension porting. Referring to FIG. 3, a tool is provided for supporting seamless extension porting. A developer of an extension for a first browser may want to run the extension in a second browser and can use the illustrated tool.

In the example of FIG. 3, the developer of an extension from GOOGLE CHROME may want to seamlessly port an extension to MICROSOFT EDGE. A developer may use a developer tool, such as extension toolkit 300 to aid with the seamless extension porting. The extension toolkit 300 can convert an unpacked GOOGLE CHROME extension to an unpacked MICROSOFT EDGE extension by bridging APIs and surfacing any errors found in a manifest file, such as manifest.json file 305, within an extension toolkit interface 310.

In order to seamlessly port the GOOGLE CHROME extension to run on MICROSOFT EDGE, the extension developer can run the extension toolkit 300 and load a copy of the extension by selecting a load command, such as Load Extension to Convert command 315. After conversion, a bridge script code 335 can be included in the manifest file code 340. The bridge script code 335 can include a preload manifest key, such as -ms-preload and bridge script properties, such as backgroundScript and contentScript. The backgroundScript property can provide the bridge for a background process and the contentScript property can provide the bridge for a content process.

Further, when the extension is loaded, the bridge indicated by a bridge script property, in the illustrated case being two bridge script files indicated by the bridge script property, backgroundScriptsAPIBridge.js 320 and contentScriptsAPIBridge.js 325, can be added to the extension's folder (e.g., My extension 330). The bridge script files bridge APIs of a first browser (e.g., GOOGLE CHROME) to APIs of a second browser (e.g., MICROSOFT EDGE), while polyfilling when necessary. Advantageously, the bridge enables the extension developer to avoid having to change any GOOGLE CHROME specific code in the extension's folder (e.g., My extension 330), such as code located in the background script or content script.

The extension toolkit 300 may perform a static analysis of the extension code and report all errors, warnings, and information within icons in the extension toolkit interface 310, such as data icons 345. The extension toolkit interface 310 may also provide information 350 about the error, warning, and information notices in the data icons 345. Once the extension developer has corrected all errors, the developer can select a re-validate command 355 to check for any additional errors. When there are no error notices within the data icons 345, the extension developer may select a save files command 360 to save the converted extension. Once the conversion is complete, the extension may be loaded in MICROSOFT EDGE and the GOOGLE CHROME APIs will be seamlessly ported to supported MICROSOFT EDGE APIs.

Figure 4:
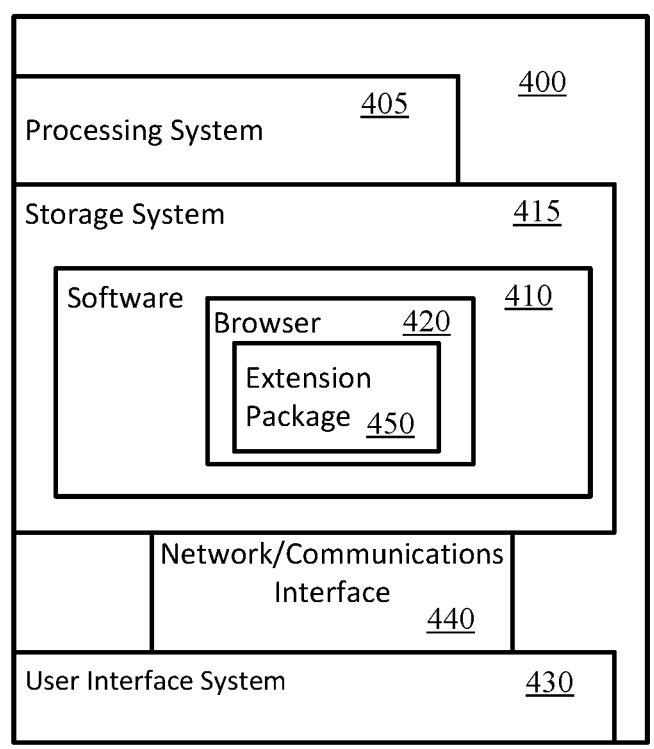
FIG. 4 shows a block diagram illustrating components of a computing system or device that may implement the described extensions incorporating seamless extension porting.

FIG. 4 shows a block diagram illustrating components of a computing system or device that may implement the described extensions incorporating seamless extension porting. Referring to FIG. 4, system 400 represents a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 400 may be incorporated to implement a particular computing device.

System 400 includes a processing system 405 of one or more processors to transform or manipulate data according to the instructions of software 410 stored on a storage system 415. Examples of processors of the processing system 405 include general purpose central processing units, application specific processors, and logic devices, as well as any other type of processing device, combinations, or variations thereof. The processing system 405 may be, or is included in, a system-on-chip (SoC) along with one or more other components such as network connectivity components, sensors, video display components.

The software 410 can include an operating system and application programs such as a browser 420 that may include extension package 450. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 4, can be thought of as additional, nested groupings within the operating system space, each containing an OS, application programs, and APIs.

Storage system 415 may comprise any computer readable storage media readable by the processing system 405 and capable of storing software 410 including the browser 420 and the extension package 450.

Storage system 415 may include volatile and nonvolatile, removable and non-removable media implemented in any method or technology for storage of information, such as computer readable instructions, data structures, program modules, or other data. Examples of storage media of storage system 415 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory, propagated signal.

Storage system 415 may be implemented as a single storage device but may also be implemented across multiple storage devices or sub-systems co-located or distributed relative to each other. Storage system 415 may include additional elements, such as a controller, capable of communicating with processing system 405.

Software 4110 may be implemented in program instructions and among other functions may, when executed by system 400 in general or processing system 405 in particular, direct system 400 or the one or more processors of processing system 405 to operate as described herein.

In general, software may, when loaded into processing system 405 and executed, transform computing system 400 overall from a general-purpose computing system into a special-purpose computing system customized to seamlessly port extensions as described herein. Indeed, encoding software on storage system 415 may transform the physical structure of storage system 415. The specific transformation of the physical structure may depend on various factors in different implementations of this description. Examples of such factors may include, but are not limited to the technology used to implement the storage media of storage system 415 and whether the computer-storage media are characterized as primary or secondary storage.

The system can further include user interface system 430, which may include input/output (I/O) devices and components that enable communication between a user and the system 400. User interface system 430 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 430 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system 430 may also include user interface software and associated software (e.g., for graphics chips and input devices) executed by the OS in support of the various user input and output devices. The associated software assists the OS in communicating user interface hardware events to application programs using defined mechanisms. The user interface system 430 including user interface software may support a graphical user interface, a natural user interface, or any other type of user interface. For example, the interfaces for the customization realty renovation visualization described herein may be presented through user interface system 430.

Communications interface 440 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 400 is generally intended to represent a computing system with which software is deployed and executed in order to implement an application, component, or service as described herein. In some cases, aspects of computing system 400 may also represent a computing system on which software may be staged and from where software may be distributed, transported, downloaded, or otherwise provided to yet another computing system for deployment and execution, or yet additional distribution.

Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

It should be understood that the examples described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method comprising:
receiving a call to execute, at a second browser of a client device, extension code containing function calls for a first browser, the extension code further comprising a manifest file comprising a preload manifest key, the preload manifest key comprising at least one bridge script property providing a bridge between function calls for the first browser and function calls for the second browser, wherein the preload manifest key signals that the bridge should be loaded and executed before other extension code; and
in response to receiving the call to execute the extension code:
performing the at least one bridge script property of the preload manifest key to execute the bridge referenced in the at least one bridge script property, and subsequently to the at least one bridge script property, executing remaining code of the extension code;
wherein the bridge receives function calls by the extension code and when a function call for the first browser is received, the bridge maps the function call for the first browser to a corresponding function call supported by the second browser.

2. The method of claim 1, wherein the bridge is a JavaScript file indicated by the at least one bridge script property.

3. The method of claim 1, wherein one of the at least one bridge script property is a backgroundScript property providing the bridge for a background process.

4. The method of claim 1, wherein one of the at least one bridge script property is a contentScript property providing the bridge for a content process.

5. The method of claim 1, wherein the preload manifest key is -ms-preload.

6. The method of claim 1, wherein the first browser is a GOOGLE web browser and the second browser is a MICROSOFT web browser.

7. The method of claim 1, wherein when the bridge maps the function call, the bridge defines the function call for the first browser to call a corresponding function call for the second browser, the function call for the first browser being a known function.

8. A system comprising:
a processing system;
a storage system;
a second browser stored on at least one storage resource of the storage system; and
extension code containing function calls for a first browser and comprising a manifest file comprising a preload manifest key, the preload manifest key comprising at least one bridge script property providing a bridge between function calls for the first browser and function calls for the second browser stored on the at least one storage resource of the storage system, wherein the preload manifest key signals that the bridge should be loaded and executed before other extension code, wherein the second browser and the extension code executed by the processing system, direct the processing system to at least:
in response to receiving a call to execute the extension code:
perform the at least one bridge script property of the preload manifest key to execute the bridge referenced in the at least one bridge script property, and subsequently to the at least one bridge script property, execute remaining code of the extension code;
wherein the bridge receives function calls by the extension code and when a function call for the first browser is received, the bridge maps the function call for the first browser to corresponding function call supported by the second browser.

9. The system of claim 8, wherein the bridge is a JavaScript file indicated by the at least one bridge script property.

10. The system of claim 8, wherein one of the at least one bridge script property is a backgroundScript property providing the bridge for a background process.

11. The system of claim 8, wherein one of the at least one bridge script property is a contentScript property providing the bridge for a content process.

12. The system of claim 8, wherein the preload manifest key is -ms-preload.

13. The system of claim 8, wherein when the bridge maps the function call, the bridge defines the function call for the first browser to call a corresponding function call for the second browser, the function call for the first browser being a known function.

14. A computer readable storage medium having instructions stored therein that, when executed by a processor, perform a method comprising:
receiving a call to execute, at a second browser of a client device, extension code containing function calls for a first browser, the extension code further comprising a manifest file comprising a preload manifest key, the preload manifest key comprising at least one bridge script property providing a bridge between function calls for the first browser and function calls for the second browser, wherein the preload manifest key signals that the bridge should be loaded and executed before other extension code; and
in response to receiving the call to execute the extension code:
performing the at least one bridge script property of the preload manifest key to execute the bridge referenced in the at least one bridge script property, and subsequently to the at least one bridge script property, executing remaining code of the extension code;
wherein the bridge receives function calls by the extension code and when a function call for the first browser is received, the bridge maps the function call for the first browser to corresponding function call supported by the second browser.

15. The medium of claim 14, wherein the bridge is a JavaScript file indicated by the at least one bridge script property.

16. The medium of claim 14, wherein one of the at least one bridge script property is a backgroundScript property providing the bridge for a background process.

17. The medium of claim 14, wherein one of the at least one bridge script property is a contentScript property providing the bridge for a content process.

18. The medium of claim 14, wherein the preload manifest key is -ms-preload.

19. The medium of claim 14, wherein when the bridge maps the function call, the bridge defines the function call for the first browser to call a corresponding function call for the second browser, the function call for the first browser being a known function.

20. The medium of claim 14, wherein the first browser is a GOOGLE web browser and the second browser is a MICROSOFT web browser.

* * * * *